Dec. 1, 1959  D. S. CLEVELAND  2,914,945
MASS FLOWMETER
Filed Feb. 13, 1957  4 Sheets-Sheet 1

Inventor:
Donald S. Cleveland
by Richard E. Hosley
His Attorney

Dec. 1, 1959  D. S. CLEVELAND  2,914,945
MASS FLOWMETER
Filed Feb. 13, 1957  4 Sheets-Sheet 2

Fig. 2

Inventor:
Donald S. Cleveland
by Richard E. Hosley
His Attorney

Dec. 1, 1959 D. S. CLEVELAND 2,914,945
MASS FLOWMETER

Filed Feb. 13, 1957 4 Sheets-Sheet 3

Inventor:
Donald S. Cleveland
by Richard E. Horley
His Attorney

Dec. 1, 1959 D. S. CLEVELAND 2,914,945
MASS FLOWMETER

Filed Feb. 13, 1957 4 Sheets-Sheet 4

Inventor:
Donald S. Cleveland
by Richard E. Hosley
His Attorney

United States Patent Office 2,914,945
Patented Dec. 1, 1959

2,914,945

MASS FLOWMETER

Donald S. Cleveland, Beverly, Mass., assignor to General Electric Company, a corporation of New York Application February 13, 1957, Serial No. 639,976

17 Claims. (Cl. 73—194)

The present invention relates to improved measurement apparatus and, in one aspect, to improved flow measuring systems accurately responsive to mass of fluid flow per unit of time.

In the measurement of fluid flow in terms of its mass, rather than volume, it has been found that highly accurate indications, without compensations for density and viscosity variations, may be realized through use of detectors each including an impeller rotated at a constant angular velocity and accelerating the metered fluid to a predetermined linear speed about the axis of impeller rotation. One preferred flowmeter further includes a resiliently-restrained reaction turbine in downstream relationship to the impeller and disposed such that the accelerated fluid impinges upon it and occasions measurable angular deflections related to the mass rate of flow. An axial-flow mass flowmeter, for example, may include a hollow cylindrical casing in which is positioned an upstream cylindrical impeller which has longitudinal peripheral slots and is rotated at a substantially constant speed, whereby the fluid flowing through the impeller has a substantially uniform linear speed of motion imparted to it in one angular direction about the longitudinal axis of the impeller. A cylindrical reaction turbine element is provided in proximate collinear downstream relationship to the impeller and is likewise constructed to have longitudinal peripheral slots to accommodate fluid flow. Torques tending to deflect the turbine angularly are sensed as being characteristic of the mass of flow per unit of time.

Any deviations from uniformity of speed of the motor rotating the impeller result in erroneous mass flow measurements, and while small discrepancies are tolerable in most instruments, optimum performance dictates that the impeller drive motor maintain a predetermined uniform speed with the utmost precision. If, in the aforementioned type of flowmeter, for example, the impeller speed is lowered while the mass rate of fluid flow under measurement remains unchanged, the reaction turbine will tend to deflect less and thus yield an erroneous indication. The errors with increased impeller speed are of opposite sense, of course. True constant-speed motive devices would avoid these difficulties although, practically, such devices tend to be complex, costly, wasteful of power, or subject to undesirable speed fluctuations. Controlled frequency power supplies, frequency compensators, speed governors, amplifiers, and turbine-generator sets, are representative of such devices which may be required to lessen the errors occasioned by variations in impeller speed and which yet introduce the aforesaid complications. Further difficulties with apparatus of this nature may appear in the course of attempted integrations of measurements with respect to time, it being important that the integrating equipment be uncomplicated yet precise in output.

Accordingly, it is one of the objects of the present invention to provide novel and improved mass flow measurement apparatus operating in accordance with angular momentum principles.

A further object is to provide cooperating flowmeter and gyroscope devices in an improved mass flow measuring system which may be energized by simple unregulated sources and which yields accurate integrated measurements with respect to time.

An additional object is to provide mass flowmeter apparatus of the angular momentum type wherein the need for precision constant speed motive means is obviated.

By way of a summary account of this invention in one of its aspects, there is provided a mass flow detector having a rotatable fluid impeller powered by an electric motor which is energized by a source of unregulated power in such a manner that the motor speed may vary. Although this detector provides an output signal characterizing the fluid torque about the axis of impeller rotation, this signal nevertheless does not represent the mass of fluid flow because of the impeller speed variations. However, the flow detector output signals occasion related torques about the minor suspension axis of a universally-mounted gyroscope, the rotor of which is driven by an electric motor also energized by the aforesaid source in a manner permitting related speed variations, whereby the speed of gyro precessional rotation about its major suspension axis then becomes related to the mass of fluid flow per unit of time. Measurement of this rotational speed provides an indication of the mass rate of flow, and totalization of the gyro revolutions about the major axis, as by a simple counter, provides integrated, or total mass flow, indications.

Although the features of this invention which are believed to be novel are set forth in the appended claims, additional details of the invention itself and the further objects and advantages thereof may be most readily comprehended through reference to the following description taken in connection with the accompanying drawings, wherein:

Figures 1, 3:
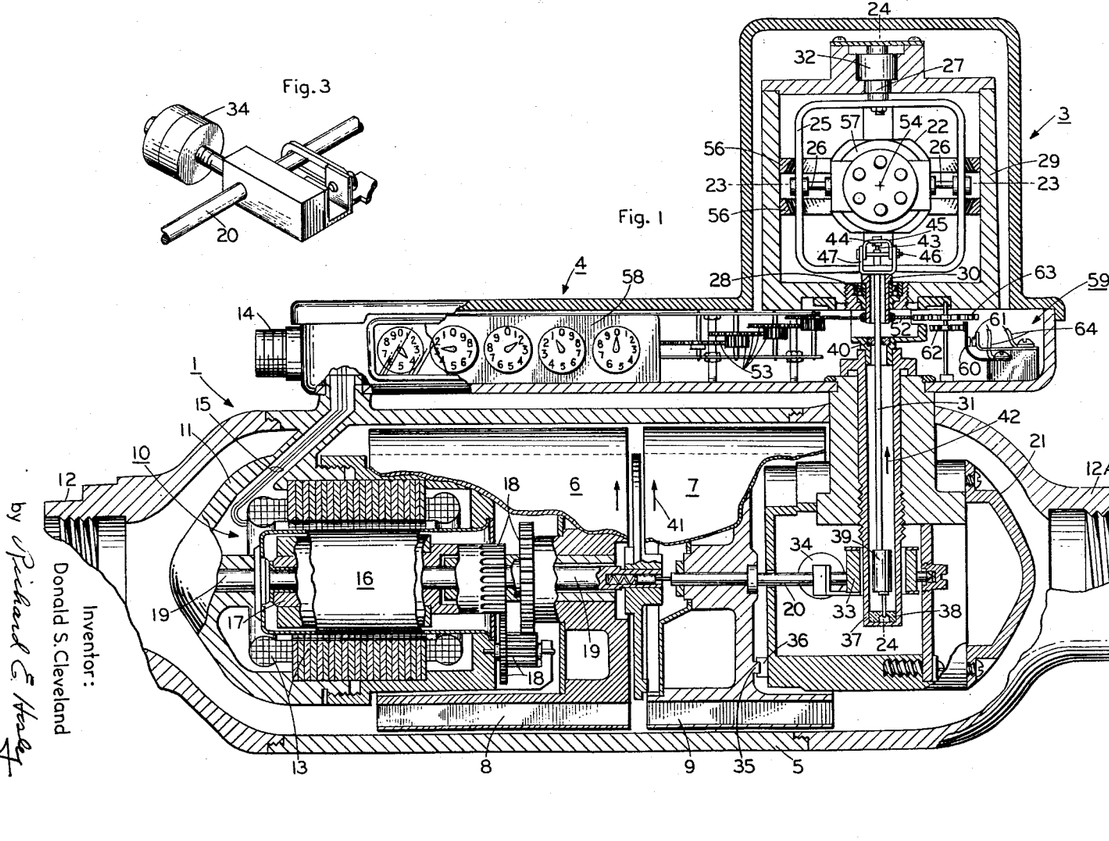
Figure 1 illustrates, in a partly pictorial and partly sectionalized side view, one construction of a mass flowmeter constructed in accordance with the present teachings.
Figure 3 is a pictorial detail of one portion of the assembly of Figures 1 and 2.

One preferred flowmeter system in which this invention may be practiced is shown in Figure 1 of the drawings to comprise an axial-flow detector unit 1 in association with a universally-mounted gyroscope unit 3 and an indicator or register 4. Referring first to the flow detector unit 1, it should be noted that the generally cylindrical hollow housing 5 thereof surrounds an upstream impeller 6 and a proximate collinear downstream reaction turbine 7, both the impeller and turbine being generally cylindrical in outer configuration and each having a plurality of longitudinal peripheral fluid-conducting passages or openings separated by partitions 8 and 9, respectively.

The impeller and turbine fit closely within the inner cylindrical surfaces of housing 1, and both are mounted for angular movement about their collinear longitudinal axes. In the case of the impeller 6, provision is made for its rotation by a synchronous electric motor 10 which is nested within the upstream streamlined bracket 11 disposed near the inlet coupling 12. A.-C. excitation for the sealed motor stator 13 is brought from a suitable source by way of electrical coupling 14 and leads 15, whereupon the motor rotor 16 and bracket-supported shaft 17 are caused to rotate at synchronous speeds related to the frequencies of the A.-C. source. Gearing 18 between rotor shaft 17 and impeller 6 occasions rotation of the latter at proportionally lower speeds. The motor shaft 17 and impeller 6 are rotatably supported on a fixed cantilever shaft 19 supported by the bracket 11 and extending coaxially of the housing 5. A shaft 20 extending coaxially of the turbine and fixed for rotation with the turbine is rotatably supported at one end in coaxial alignment with the shaft 17 by the bracket 21 and is rotatably supported at its opposite end by a bearing carried by the free end of the shaft 19. Were the motor and impeller speeds substantially constant, the angular momentum of fluid leaving the downstream end of impeller 6 would then be rather precisely related to the mass of fluid flow per unit of time. In turn, the downstream turbine 7, which is supported by the angularly-movable shaft 20 positioned by downstream bracket 21 and shaft 19, would evidence a torque about its longitudinal axis which is accurately related to the mass of fluid flow per unit of time. This torque results from the reduction of fluid angular momentum in the turbine before it is discharged through the downstream coupling section 12A, and measurements responsive to this torque provide desired mass flow information. In certain applications where the available A.-C. source frequency is substantially constant and of a predetermined value, or where a frequency-regulated supply is provided, very precise measurements are thus obtainable. Depending upon the degree and type (for example, long- or short-term) of accuracies required, the source characteristics and impeller speed may be permitted to vary more extensively, while the operation nevertheless may be considered satisfactory. If desired, certain details of mass flowmeter constructions similar to that embodied in detector unit 1 may be perceived in the disclosures of U.S. Patent No. 2,714,310, assigned to the same assignee as that of the present application.

Coacting with the aforesaid detector unit is a measurement transducer, in the form of a universally-mounted gyro unit 3. This latter unit is disposed outside the detector unit housing 1, although mounted in fixed relationship to it. The gyro suspension is of a universal type in that the rotor structure 22 is afforded angular freedom about both a minor axis 23—23 and a major suspension axis 24—24, the rotor spin axis 54—54 and both of the suspension axes being normally mutually perpendicular. In the usual manner, the rotor is journalled for rotation in the rotor structure 22, and the latter is in turn supported for angular movement in main gimbal 25 by minor axis trunnions 26. Bearings 27 and 28 fixed upon the stationary outer frame 29 provide support for angular movement of the main gimbal trunnions, the lower of which, 30, is hollow for the purpose of accommodating a force rod 31 therethrough. Slip ring structure 32 affords the customary electrical couplings between the aforementioned A.-C. source and the synchronous electric motor contained within rotor structure 22 for driving the high-inertia gyro rotor.

Figure 2:
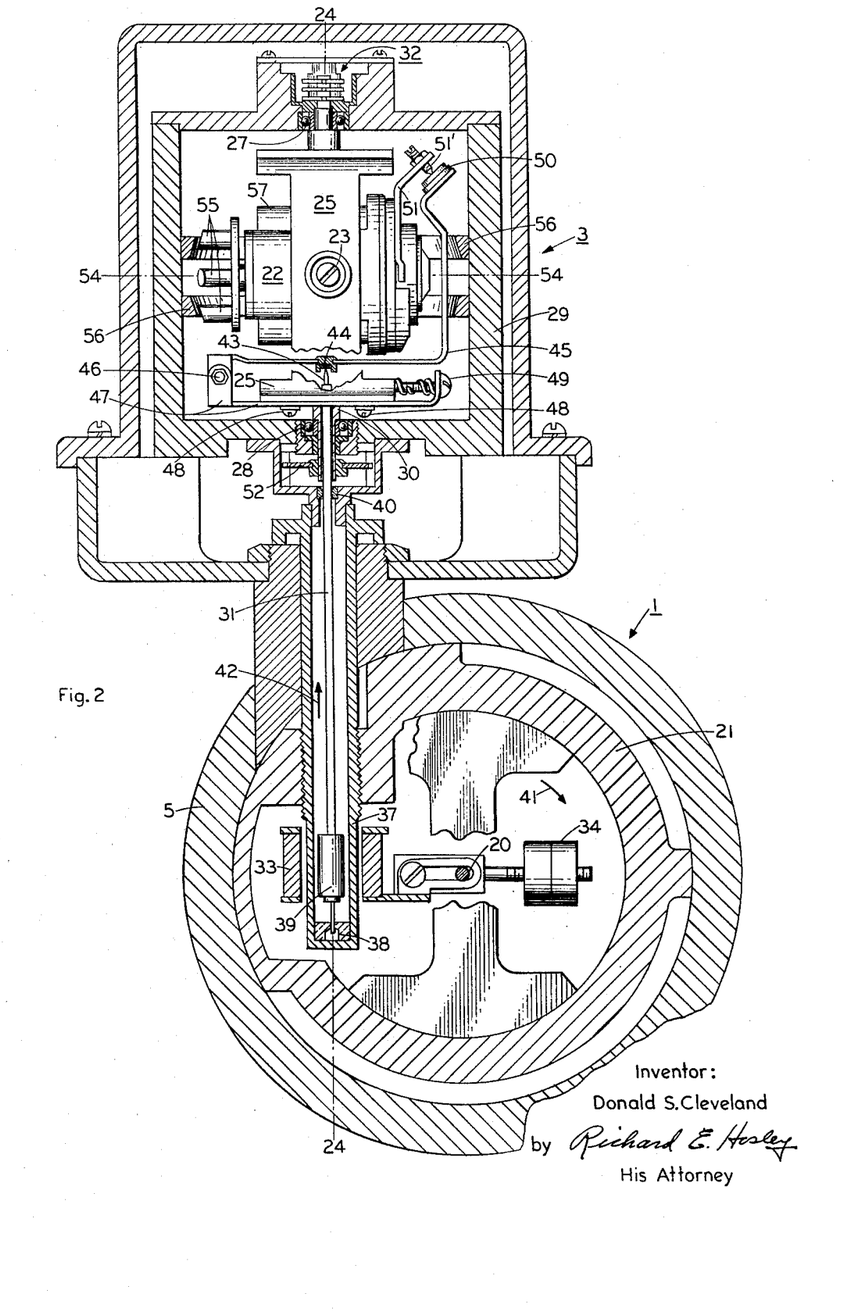
Figure 2 is a transverse cross-section of the apparatus of Figure 1.

As clearly shown in Figures 1–3, the turbine shaft 20 carries a magnet and counterweight assembly suitably fixed for movement with the shaft. The magnet and counterweight assembly comprises a magnet 33 carried at the outer free end of an arm extending radially of the shaft 20. The arm has an upstanding flange at its inner end which is provided with a slot through which the shaft 20 extends. A clamping screw extends through the slot and is threadably engaged in a bracket carried by a support member fixed to the shaft 20. The slot and screw mounting of the magnet carrying arm permits adjustment of the magnet radially of the shaft 20 to a predetermined position. A counterweight 34 is threadably mounted on the outer end of a rod fixed to the support member at its inner end and extending radially of the shaft 20 in parallel with the magnet supporting arm. Stops 35 and 36 on the turbine and downstream bracket, respectively, limit relative movement between the bracket and turbine. The hollow cylindrical coupling magnet 33 supported by turbine shaft 20 is disposed in a surrounding relationship to the sealed non-magnetic tube 37, which acts as a fluid-tight seal between the gyroscope and flow detector. Within tube 37 the force rod 31 is axially slidable in bearing 38 under influence of an attached magnetic coupling member 39 which tends to remain axially centered with reference to the turbine coupling magnet 33. Ringstone bearing 40 also guides axial movement or thrusts of force rod 31. As the torques experienced by turbine 7 occur in the direction of arrow 41 under influence of metered fluid flow, the coupling magnet 33 tends to move in the same angular direction. Actually, the ensuing movements are almost imperceptible because the magnet 33 is restrained by the cooperating centered cylindrical magnetic member 39 fixed with the axially-restrained force rod 31. However, forces of magnitudes representative of the turbine torques are nevertheless delivered along force rod 31, as indicated by arrow 42.

This force rod, 31, projects through the hollow major-axis trunnion 30 such that its end 43 is in a position to bear against a low-friction thrust endstone 44 on a torque link 45 held by pivot 46 on a mount 47 fastened to the gyro main gimbal 25. Fastening bolts 48 for mount 47, and an adjusting screw 49 for adjustably positioning the mount on gimbal 25, are visible in Figure 2. Thrusts experienced by force rod 31 are thus applied to link member 45 and in turn are exerted about the minor gyro axis 23—23 by the contacting link-end 50 and rotor structure bracket 51. Adjusting screw 51' on this bracket enables the desired unidirectional coupling with link-end 50 to be established precisely. As is known to those skilled in the art, torques applied about a gyro minor axis result in precession of the main gimbal about the major axis without attendant movement of the rotor structure about the minor axis. Accordingly, the aforesaid thrusts and torques occasion such main gimbal precession, and an output gear 52 fixed with the main gimbal trunnion 30 actuates the register 4 through suitable intermediate gearing 53.

For that purpose of preserving the gyro rotor spin axis 54—54 in a normally perpendicular relationship to the major suspension axis 24—24, and thereby preserving members 51' and 50 in engagement and preserving predetermined relationships between the minor axis torques and major axis precession, the gyro rotor structure is "levelled" by a set of rotatable permanent magnets 55 co-operating with a pair of electrically conductive levelling rings 56 mounted on frame 29. Magnets 55 are mounted for movement with the gyro rotor member 57, and thus are rotated about spin axis 54—54 by the gyro motor together with the gyro rotor member 57. In a known manner, the rotating magnetic field thus established is caused to intercept the parallel spaced conductive rings 56 and induce eddy currents therein which in turn result in magnetic fields reacting with magnets 55 to maintain the spin axis in a predetermined relationship to the rings. Thus, during precession of the main gimbal, as described above, the magnets and rings will tend to maintain the spin axis of the rotor member 57 in a predetermined relationship to the major axis 24—24. It is preferred that the levelling rings 56 be mounted for movement longitudinally of the major axis 24—24, such as by press fit engagement within the frame 29 to permit adjustment of the ring positions to obtain desired adjustments of the spin axis about minor axis 23—23.

Figure 4:
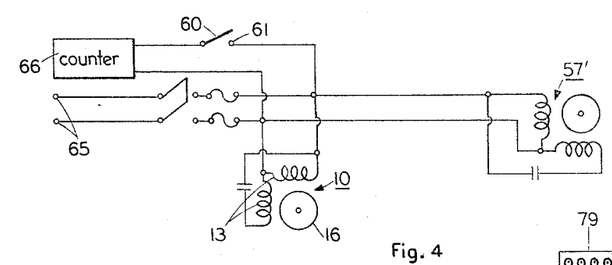
Figure 4 provides a schematic wiring diagram for the apparatus of Figures 1 and 2.

Indicator 4, which is shown to be in the form of a known meter register 58, counts or totalizes the precessional revolutions of the gyro main gimbal. Remote totalization may also be realized through use of the contactor 59 which includes a pair of make-and-break contacts 60 and 61 actuated by a cam wheel 62 which is turned by a gear 63 meshing with the gimbal trunnion gear 52. The remote unit, coupled with contact leads 64, is not illustrated, although it will be understood to include the common elements, such as a source and relay in series with contacts 60 and 61, the relay movements serving to actuate a counter. For reasons discussed more fully hereinafter, the indications are of mass of fluid flow, despite speed fluctuations of the flowmeter impeller motor 10. In this connection, reference should be made to the schematic illustration of Figure 4 wherein the gyro rotor motor 57' and flowmeter impeller motor 10 are shown to be coupled across the same A.-C. source terminals 65. Both motors are shown to be of the known split-phase synchronous type and their rotors run at precisely related speeds dependent upon and simultaneously varying with the frequencies of the excitation applied to source terminals 65. Figure 4 also depicts the make-and-break contacts 60 and 61 coupled with an electromagnetic counter assembly 66.

The angular velocity of precessional rotation of gyro main gimbal 25 about the major suspension axis 24—24 is found to be directly proportional to the torque applied about the minor axis 23—23 but inversely proportional to the speed of rotation of the gyro rotor 57 about the spin axis 54—54. This latter inverse proportionality proves to be of pronounced importance to improved operation of the flowmetering ssytem. The aforesaid relationship may be expressed thus:

$$W_o = k_1 \frac{T_1}{W_G}$$

where $W_o$=angular velocity of main gimbal precession,
$W_G$=angular velocity of gyro rotor,
$k_1$=constant for the particular gyroscope, and
$T_1$=torque applied about the gyro minor axis.

In the flowmeter detector unit, it is found that the torque $T_2$ experienced by turbine 7 is a function of the mass of fluid flow per unit of time, M, and the speed of rotation $W_I$ of the impeller 6. This relationship is:

$$T_2 = k_2 M W_I$$

where $k_2$ is a constant.

But, the relationship between $T_1$ and $T_2$ is also established by a constant, $k_3$:

$$T_1 = k_3 T_2$$

such that the angular velocity of gyro precession, $W_o$, is also defined:

$$W_o = \frac{k_1 k_2 k_3 M W_I}{W_G}$$

Figure 5:
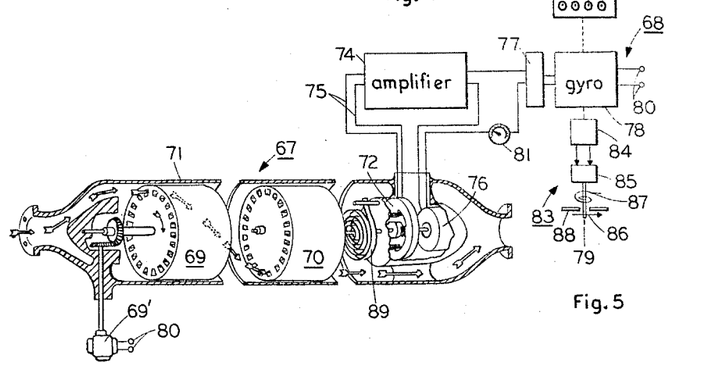
Figure 5 depicts an alternative mass flow measurement system including a remote gyro unit, the showing being partly schematic and partly in simplified pictorial form.

In addition, the like excitation of the synchronous motors driving the flowmeter impeller and gyro rotor cause both motors to preserve a constant speed relationship:

$$\frac{W_I}{W_G} = k_4$$

whereby, reducing all constants to a value K, $$W_o = KM$$

that is, the angular velocity of main gimbal precession is related to the mass of fluid flow per unit of time and, significantly, is substantially independent of the excitation source variations. This results in a system which operates to measure mass flow precisely even though the A.-C. excitation source fluctuates in frequency or possesses a different frequency at different installation points, for example. Not only are frequency-regulated sources or frequency compensation devices rendered unnecessary, but the measurement and integration of precession speed, and thus mass flow, may be made simply and accurately without amplifiers or other intermediate devices which may in themselves comprise error sources. It is further found that the gyro unit need not be of a complex or highly precise manufacture because its major disadvantage in other applications, namely drift, is not of proportions which seriously affect the flowmeter system accuracies. Rate of flow measurements, in terms of mass of fluid flow per unit of time, may be made accurately through measurement related to the rate of rotation of the gyro main gimbal. Sensitive tachometer structures or generator-ammeter combinations are examples of units which may be employed to achieve such instantaneous rate indications.

Where it is desired that the indications be provided remotely or that the gyro and flow detector units be physically separated for other reasons, an arrangement such as that portrayed in Figure 5 is advantageous. There the flow detector unit 67 and remote gyro unit 68 are intercoupled electrically to yield an improved flowmetering system. As in the case of the earlier-described flow detector, detector unit 67 includes a collinear array of an upstream impeller 69, driven by a motor 69', and a downstream turbine 70 within a fluid-conducting housing 71. Turbine 70 is angularly biased to a predetermined position by a low-torque bias spring 89, and small angular deflections resulting from turbine torques due to fluid flow are sensed by an electrical pick-off 72 which is in the form of a known type of differential transformer. Output signals from this pick-off are applied to an amplifier 74 over leads 75, and the amplified output of this amplifier is applied to the series combination of two torque motors 76 and 77, the former being coupled with the flowmeter turbine 70 and the latter with the universally-mounted gyro 78. The same output current flows through these torque motors, and they are thus caused to exert related torques about their respective axes of movement, because both torque motors are selected on the basis of like torque vs. input current characteristics. Torque motor 77 applies its torque about the minor suspension axis of gyro 78, while torque motor 76 applies its torque to turbine 70 in a direction to overcome the tendencies of turbine 70 to move from its null or biased position. As the mass of fluid flow per unit of time increases through housing 71, turbine 70 tends to deflect angularly, and the slightest attendant movement of this type causes pick-off 72 to deliver an appropriate output to amplifier 74. Increased amplifier output current is then delivered to both torque motors, 76 and 77, such that the former exerts precise opposing torques preventing movement of turbine 70 from the null position and such that torque motor 77 applies precise precessing torques about the minor axis. As in the case of the preceding embodiment, the speed of gyro precessional movement about the major suspension axis, 79—79, is increased in direct relationship to the mass of fluid flow per unit of time when the impeller motor 69' and the gyro rotor motor (details not shown) rotate at related speeds, even though these speeds are not of a constant or predetermined value. These related speeds are insured by utilizing synchronous motors for both the gyro rotor motor and impeller motor 69' and by exciting them from a single A.-C. source over common terminals 80. Decreasing mass rate of fluid flow results in opposite effects.

Measurements responsive to the amplifier output current, as by way of the ammeter 81, will provide an indication of the mass rate of flow if the gyro rotor motor and impeller motor 69' operate at predetermined constant speeds. However, departures from such speeds introduce measurement errors, and these errors are overcome by measurements responsive to gyro precession about the major axis 79—79. Integrated mass flow data may be read from a simple counter 82 actuated by the gyro main gimbal, and instantaneous indications of the mass rate of flow may be read from a rate unit 83 which responds to the speed of gyro main gimbal rotation. In one embodiment, the rate unit 83 may comprise a known tachometer-type structure including a spring-restrained pointer actuated by an eddy-current drag disk interacting with magnets rotated by the gyro main gimbal. Where the reflected torques should be small and where the main gimbal precessional speeds are expected to be relatively slow, however, an alternative structure may be preferred, including a low-torque electrical generator 84 driven by the gyro main gimbal and exciting a sensitive motor movement 85 which may be the moving-coil movement of a sensitive instrument, for example. The pointer 86, restrained by sensitive spring 87, then indicates mass rate of flow in cooperation with the dial 88. Like rate indicator units may be employed in connection with the system of Figures 1 and 2, also.

Figure 6:
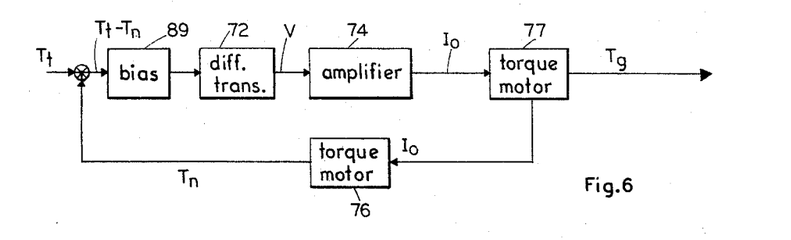
Figure 6 is a block diagram of a portion of the system of Figure 5.

Referring to the explanatory partial block diagram of Figure 6, it will be observed that the fluid torque $T_t$ experienced by turbine 70 is opposed by the nulling torque $T_n$ of the torque motor 76, such that the differential transformer 72 is deflected angularly from a null position by minute amounts. Bias spring 89 may be of negligible influence compared with the torques available from torque motor 76. Voltage V from the differential transformer 72 excites amplifier 74 in its delivery of output currents $I_0$ to both torque motors, the torque motor 77 yielding a gyro precessing torque $T_g$ which is accurately proportioned in relation to the turbine nulling torque $T_n$. With a high gain forward loop operation:

$$T_n \cong T_t$$

and, because current $I_0$ is common to both torque motors, $$T_n \alpha T_g$$

Also, $$T_t = k_1 M W_I$$

where $k_1$=constant,
$M$=mass of fluid flow per unit of time, and
$W_I$=angular velocity of impeller rotation.

The minor axis gyro torque is found to be related to the flow detector turbine torque as follows:

$$T_g = k_2 T_n \cong k_2 T_t$$

where $k_2$ is another constant.

Speed of precession, $W_p$, of the gyro about its major suspension axis is inversely proportional to the angular velocity $W_g$ of the gyro rotor:

$$W_p = k_3 \frac{T_g}{W_g}$$

such that $$W_p = k_4 M \frac{W_I}{W_g}$$

where $k_3$ and $k_4$ are constants.
Critically, $$W_p = KM$$

inasmuch as $$k_4 \frac{W_I}{W_g}$$

becomes a new constant, K, occasioned by synchronous operation of the gyro rotor motor and impeller.

Figure 7:
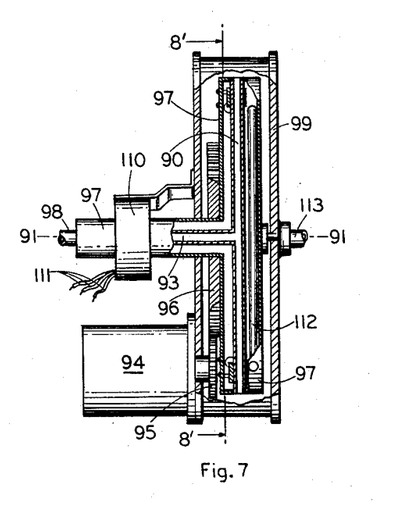
Figures 7 and 8 provide side and transverse cross-sectional views of a Coriolis mass flow detector useful in the practice of my teachings.
Figure 8:
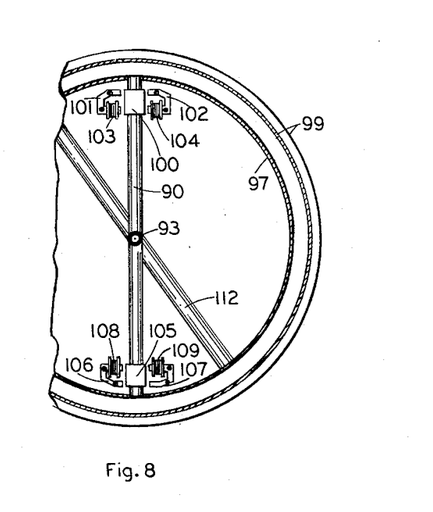
Figure 9:
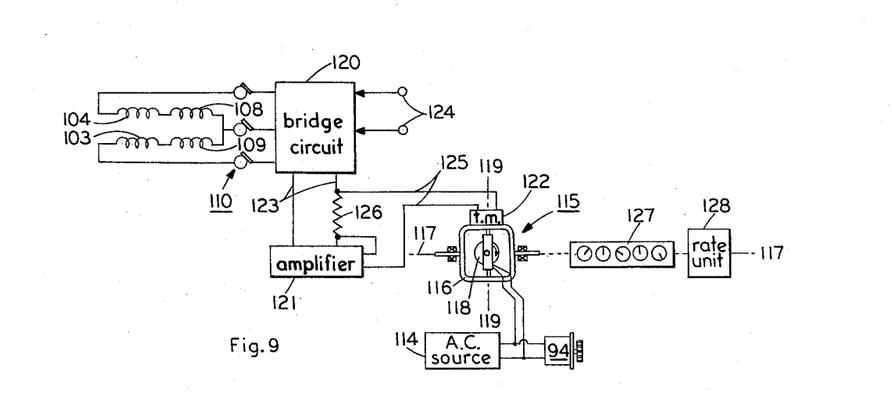
Figure 9 is a wiring and block diagram of an improved flowmetering system utilizing the detector of Figures 7 and 8.

The present teachings have applications not limited to systems, involving impeller-turbine types of mass flow detectors. By way of illustration of this, a radial flow detector construction wherein Coriolis acceleration effects take place is shown in Figures 7 and 8, and a related system circuitry embracing this invention appears in Figure 9. The Figures 7 and 8 flow detector does not include a member functioning as a measurement turbine, and instead, involves measurements of angular deflections of ends of the driven fluid impeller member 90 about its axis of rotation 91—91. Impeller 90 is in the form of a T-shaped tube rotated about its stem 93 by a synchronous electric motor 94 through gears 95 and 96 and part of the rotatable inner casing 97 which surrounds all but the ends of T-tube 90. The inner casing 97 and the T-tube 90, which is attached to casing 97 at its stem end, are rotatable in relation to the fluid inlet coupling 98 and the outer cylindrical housing 99. Fluid admitted through inlet coupling 98 travels through the stem 93 of T-tube 90 and thence radially outward through the two halves of the cross-arm and into the interior of outer casing 99. Motor 94 rotates the T-tube 90 and inner casing or viscous drag shield 97 all the while such that the rotated fluid is increased in linear speed (angular velocity X radius) about axis 91—91 before being expelled from the free ends of tube 90. As shown in Figure 8, the free ends of the tube 90 extend into apertures in the peripheral wall of the drag shield 97, the apertures being of greater diameter than the outer diameters of the free ends of the tube 90. These free ends may thus move in relation to viscous drag shield 97 under influence of the fluid acceleration, and these movements are sensed by a pair of differential electrical pick-offs. The Figure 8 section taken along section-line 8'—8' in Figure 7 shows that one of these pick-offs comprises a magnetic member 100, fixed with one end of tube 90, and a pair of U-shaped cores 101 and 102 fixed with drag shield 97 and having coils 103 and 104, respectively, mounted thereon. The opposite pick-off comprises a tube-mounted magnetic member 105 cooperating with a pair of cores 106 and 107 fixed to the drag shield and having coils 108 and 109, respectively, mounted thereon. A slip ring structure at position 110 couples the pick-off coils with leads 111 in a circuit where the varying inductive effects are translated into mass of fluid flow information. Fluid which has once been accelerated in the aforesaid manner is discharged from casing 99 through another tube 112, which is wholly fixed with the drag shield 97 and delivers the fluid to an outlet coupling 113.

If the impeller drive motor 94 runs at a constant and predetermined speed, the angular deflections of impeller 90, and the measurements by the differential-type pick-offs, are accurately related to the mass of fluid flow per unit of time. However, non-uniform motor speeds, or a speed other than a predetermined value, results in erroneous deflections and measurements. Application of the present teachings avoids the difficulties and at the same time affords ready integration of flow information. For these purposes, the synchronous motor 94 is excited by the same A.-C. source 114 as that which excites the synchronous rotor motor for the gyroscope 115, as appears in the circuitry of Figure 9. Both motors must then run at related speeds, with the advantageous effect that precession of the gyro main gimbal 116 about the major suspension axis 117—117 is at speeds inversely proportional to the speed of rotation of its electrically-driven rotor 118, while the measurements sensed by the differential variable-reluctance pick-off coils 103, 104, 108, and 109 are in direct proportion to the speed of rotation of the impeller motor 94. Conversion of the measurements sensed by the pick-off coils into related torques for application about the minor axis 119—119 of the gyro 115 is aided by the bridge circuitry 120, amplifier 121, and minor-axis torque motor 122. Coils 104 and 108 are serially connected in one arm of an A.-C. bridge circuit, and the series coils 103 and 109 are connected in another arm of the bridge, with their common junction point also in the circuit. The reluctances of the magnetic circuits for coils 103 and 109 will decrease while those of coils 104 and 108 increase, and vice versa, so that the two arms of the bridge have their impedances varied in opposite senses when the impeller 90 deflects. This differential action results in delivery of appropriate output signals to amplifier 121 over leads 123. Block 120 represents the remainder of the bridge circuit, which is energized from A.-C. terminals 124 and which includes additional bridge arms and impedances of known forms. In turn, amplifier 121 responds by energizing the gyro minor-axis torque motor 122 over leads 125 such that minor axis torques related to the flow detector measurements will be exerted. Feedback of the amplifier output current through the amplifier input circuit by way of feedback resistance 126 provides an accurate control of proportionality between the amplifier output and input. Torques applied by torque motor 122 vary not only with the mass of fluid flow through the flow detector unit but also with the speed of impeller motor 94. However, because the speed of gyro rotor 118 also varies with the speed of motor 94, and because the speed of precession about axis 117—117 varies inversely with speeds of rotor 118 and motor 94, the precession speed is directly related to the mass of fluid flow per unit of time. A simple counter 127 connected to the main gyro gimbal 116 provides indications of integrated mass flow, in terms of total weight, and a speed-responsive rate unit 128, which may be similar to rate unit 83 in Figure 5, provides indications of the mass rate of flow.

Those versed in the art will recognize that my teachings are applicable with equal advantage to arrangements not specifically illustrated or described, and that certain alterations, modifications, and substitutions may be desirable in some instances. By way of illustration, it may be noted that other suitable means may be employed in place of the gyro levelling arrangement specifically disclosed to maintain the spin axis of the gyro in a predetermined angular relationship to the main axis 24—24. Also, it will, of course, be apparent that other suitable means may be substituted for the differential variable reluctance pick off coils of Figs. 7 and 8 to obtain the desired electrical output signal. As will further be apparent, the coupling between the flow indicator portion of the apparatus and the gyroscope may be accomplished by means other than that specifically described herein without departing from the scope or teachings of this invention. It will, of course, be understood that the invention is not limited to the use of the specific types of flow detectors disclosed but rather may be adapted for use with other suitable flow detectors providing an output signal proportionally related to the mass of a fluid and the rate of movement of a member acting on the fluid such as a drum type, a radial flow impeller-turbine type, or types similar to the Coriolis type wherein sensing means on the impeller provide the output signal, and regardless of whether this signal be mechanical, electrical or hydraulic in nature. It will further be apparent that my invention may also be useful in devices other than flowmeters, such as densitometers and viscosimeters, wherein a movable impeller, drag element, or the like is normally required to be driven by constant speed motor means and wherein is provided means for providing an output signal related such as to viscosity of the fluid and the speed of the impeller or drag element or in other words characterizing the desired measurement of the fluid. The application of my invention to such devices will eliminate the need for a precise constant speed drive and thus more simply and economically obtain accurate measurements.

In those arrangements wherein synchronous electric motors are utilized to drive the flow impeller and gyro rotor, it is not essential that they be excited by electrical signals of the same frequency, nor need the signals be exactly in phase. It may be sufficient that the frequencies be related, such that the motors are synchronized and run at related speeds, whereby the speeds of gyro main gimbal precessions due to minor axis torques are inversely related to the gyro rotor speeds and directly related to the impeller speeds. The effects of simultaneous variations in the rotor and impeller speeds then balance one another automatically in the manner clarified by the preceding mathematical expressions. The same advantages are realized when other types of motive means are used for driving the impeller and gyro rotor, as in the case of pneumatic motors having fluid sources of related characteristics, and as in the case of mechanical sources such as internal combustion or turbine power sources which are mechanically coupled in driving relationship to the impeller and gyro rotor.

Gyro main gimbal precessions may be in two directions, of course, depending upon the sense of the minor axis torques. Thus, as will be apparent, if two oppositely related torques corresponding to fluid flow in opposite directions were applied about the minor axis 23—23 of the gyroscope unit 3 of Fig. 1, the main gimbal 25 would precess about the major axis 24—24 in a direction corresponding to the direction of the net torque applied about the minor axis 23—23. Thus, the invention is also useful and advantageous in association with a system in which the output signals represent oppositely related values of fluid flow where it is desired to provide an indication of net flow. An example of the use of such a system might be where it is desired to provide an indication of the fluid remaining in a tank wherein flow into and out of the tank occur simultaneously.

Accordingly, it should be understood that the particular embodiments selected for illustration and detailed description are not intended to limit this invention and that these teachings may be practiced in diverse ways without departure in spirit or scope from the invention as set forth in the appended claims.

What I claim as new and desire to secure by Letters Patent of the United States is:

1. Apparatus for measurement responsive to flowing fluid comprising a fluid flow detector having a movable member interacting with fluid flowing through said detector, first motive means imparting movement to said member, means responsive to interactions between said member and fluid flowing through said detector for producing an output signal characterizing the desired measurement of the fluid flowing through said detector, a gyroscope having a rotor mounted for movements about a spin axis and about at least two mutually perpendicular support axes, second motive means rotating said rotor about said spin axis at a speed proportionally related to the rate of movement imparted to said movable member by said first motive means, means applying about one support axis of said gyroscope a torque proportionally related to said output signal, and means measuring precessional movement of said gyroscope about another support axis thereof.

2. Apparatus for measurement responsive to flowing fluid comprising a fluid flow detector having a rotatable member interacting with fluid flowing through said detector, first motive means rotating said member, means responsive to interactions between said member and fluid flowing through said detector for producing an output signal characterizing the desired measurement of the fluid flowing through said detector, a gyroscope having a rotor mounted for movements about a spin axis and about at least two mutually perpendicular support axes, second motive means rotating said rotor about said spin axis at a speed proportional to the speed of rotation of said member, means applying about one support axis of said gyroscope a torque proportionally related to said output signal, and means measuring precessional movement of said gyroscope about another support axis thereof.

3. Apparatus responsive to mass of fluid flow comprising a mass of fluid flow detector having a rotatable fluid impeller interacting with fluid flowing through said detector, first motive means rotating said impeller, means responsive to interactions between said impeller and fluid flowing through said detector for producing an output signal related to the mass of fluid flow through said detector per unit of time and the speed of the impeller, a gyroscope having a rotor mounted for movements about a spin axis and a pair of mutually perpendicular support axes, second motive means rotating said rotor about said spin axis at a speed proportional to the speed of rotation of said impeller, means applying about one of said support axes of said gyroscope a torque proportionally related to said output signal, and means indicating mass of fluid flow responsive to precessional movement of said gyroscope about the other of said support axes.

4. Apparatus responsive to flowing fluid comprising a fluid flow detector having a rotatable impeller for accelerating fluid angularly about the axis of rotation of said impeller, means producing an output signal related to the angular momentum of said fluid about said axis, a gyroscope having a rotor mounted for movements about a spin axis and a pair of mutually perpendicular support axes, means rotating said impeller and rotor about said axis of rotation and spin axis, respectively, at proportional speeds, means applying about one of said gyroscope support axes a torque proportional to said output signal, and measuring means responsive to precessional movement of said gyroscope about the other of said support axes.

5. Apparatus responsive to mass of fluid flow comprising a mass flow detector having a rotatable impeller for accelerating fluid angularly about the axis of rotation of said impeller to a linear speed dependent upon the speed of said rotation of said impeller, means producing an output signal related to the angular momentum of said fluid about said axis, a gyroscope having a rotor mounted for movements about a spin axis and mutually perpendicular major and minor support axes, means applying about the gyroscope minor support axis a torque proportionally related to said output signal, synchronous electric motor means rotating said impeller and rotor about said axis of rotation and spin axis, respectively, at proportional speeds, whereby said gyroscope tends to precess about the major support axis responsive to said torque at a speed inversely proportional to the speed of rotation of said rotor and directly proportional to the speed of rotation of said impeller, and measuring means responsive to said precession about said major axis.

6. Apparatus responsive to mass of fluid flow comprising a mass flow detector having a rotatable impeller for accelerating fluid angularly about the axis of rotation of said impeller to a linear speed dependent upon the speed of said rotation of said impeller, a first synchronous electric motor rotating said impeller about said axis, means producing an output signal related to the angular momentum of said fluid about said axis, a gyroscope having a rotor structure including a rotor mounted for rotation about a spin axis, a second synchronous electric motor rotating said rotor about said spin axis, a main gimbal supporting said rotor structure for pivotal movement about a minor support axis normal in relation to said spin axis, an outer frame supporting said main gimbal for angular movement about a major support axis normal in relation to said minor axis, means applying to said rotor structure about said minor axis a torque proportionally related to said output signal, means energizing said first and second synchronous motors to run at proportionally related speeds, whereby said gyroscope main gimbal tends to precess about said major axis responsive to said torque at a speed inversely proportional to the speed of rotation of said rotor and directly proportional to the speed of rotation of said impeller, and measuring means responsive to precessional movement of said main gimbal about said major axis.

7. Apparatus responsive to mass of fluid flow comprising a mass flow detector having a rotatable impeller for accelerating fluid angularly about the axis of rotation of said impeller, means producing an output signal characterizing the angular momentum of said fluid about said axis, a gyroscope having a rotor structure including a rotor mounted for rotation about a spin axis and mutually perpendicular minor and major support axes, means preserving said spin axis and the major support axis in a normally perpendicular relationship, means applying about the minor support axis a torque proportionally related to said output signal, motive means rotating said impeller and rotor about said axis of rotation and spin axis, respectively, at proportionally related speeds, whereby said gyroscope tends to precess about said major support axis responsive to said torque at a speed inversely proportional to the speed of rotation of said rotor and directly proportional to the speed of rotation of said impeller, and measuring means responsive to said precession about said major support axis.

8. Apparatus responsive to mass of fluid flow comprising a mass flow detector including a fluid flow casing having a rotatable impeller therein for accelerating fluid angularly about the axis of rotation of said impeller, a turbine disposed within said casing in downstream relationship to said impeller to have a torque exerted thereon about said axis by fluid accelerated by said impeller, means actuated by said turbine producing an output signal characterizing said torque, a gyroscope having a rotor mounted for movement about a spin axis and mutually perpendicular minor and major support axes, means applying about one of said support axes a torque proportionally related to said output signal, means rotating said impeller and rotor about said axis of rotation and spin axis, respectively, at proportionally related speeds, and measuring means responsive to precessional movement of said gyroscope about the other of said support axes.

9. Apparatus responsive to mass of fluid flow comprising a mass flow detector including a fluid flow casing having a rotatable impeller therein for accelerating fluid angularly about the axis of rotation of said impeller, a turbine disposed within said casing in downstream relationship to said impeller to have a torque exerted thereon about said axis by fluid accelerated by said impeller, a gyroscope rotor structure having a rotor mounted for rotation about a spin axis, a main gimbal supporting said rotor structure for pivotal movement about a minor axis normal to said spin axis, an outer frame fixed in relation to said casing and supporting said main gimbal for angular movement about a major axis normal to said minor axis, means coupling said turbine with said gyroscope rotor structure to apply to said structure about said minor axis a torque proportionally related to said torque exerted on said turbine, means preserving said spin axis and said major support axis in a normally perpendicular relationship, motive means rotating said impeller and rotor about said axis of rotation and spin axis, respectively, at proportionally related speeds, and measuring means responsive to precession of said main gimbal about said major support axis.

10. Apparatus responsive to mass of fluid flow comprising a fluid flow casing having a rotatable impeller therein for accelerating substantially all of the fluid flowing through said casing angularly about the axis of rotation of said impeller, a first synchronous electric motor rotating said impeller about said axis, a turbine pivoted within said casing about said axis in downstream relationship to said impeller to have a torque exerted thereon about said axis by fluid angularly accelerated by said impeller, a gyroscope rotor structure having a rotor mounted for rotation about a spin axis and a second synchronous electric motor rotating said rotor, a main gimbal supporting said rotor structure for pivotal movement about a minor axis normal to said spin axis, an outer frame fixed in relation to said casing and supporting said main gimbal for angular movement about a major axis normal to said minor axis, means coupled with said turbine and applying to said structure about said minor axis a force proportionally related to said torque exerted on said turbine, means preserving said spin axis and said major support axis in a normally perpendicular relationship, electrical means exciting said first and second synchronous motors to rotate at proportionally related speeds, and counter means actuated by rotation of said main gimbal and indicating mass of fluid flow.

11. A mass flowmeter comprising a mass flow detector including a fluid flow casing having a substantially cylindrical rotatable impeller therein, said impeller having a plurality of fluid-conducting openings therethrough which are linear and parallel with the longitudinal axis of rotation of said impeller, a first synchronous electric motor rotating said impeller about said axis at a speed proportionally related to the frequency of electrical excitation thereof, a substantially cylindrical turbine pivotally mounted within said casing in a downstream relationship to said impeller and having a plurality of fluid-conducting openings therethrough which are linear and parallel with the longitudinal pivot axis of said turbine and which are disposed to receive and pass fluid accelerated by the impeller, a gyroscope rotor structure having a rotor mounted for rotation about a spin axis and a second synchronous electric motor rotating said rotor at a speed proportionally related to the frequency of electrical excitation thereof, a main gimbal supporting said rotor structure for pivotal movement about a minor axis normal to said spin axis, an outer frame fixed to said casing and supporting said main gimbal for angular movement about a major axis normal to said minor axis, a force rod movable along said major axis and coupled with said rotor structure to apply a torque thereto about said minor axis without obstructing movements of said main gimbal in relation to said outer frame, means coupling said force rod with said turbine at a predetermined radial distance from said longitudinal axis of said turbine, electrical means exciting said first and second motors with signals of the same frequency, and counter means actuated by rotation of said main gimbal in relation to said outer frame.

12. A mass flowmeter comprising a fluid-conducting casing having a substantially cylindrical rotatable impeller therein for accelerating substantially all of the fluid flowing through the casing angularly about the axis of rotation of the impeller, said impeller having a plurality of fluid-conducting openings therethrough which are linear and parallel with the longitudinal axis of rotation of said impeller, a first synchronous electric motor rotating said impeller about said axis at a speed proportionally related to the frequency of electrical excitation thereof, a substantially cylindrical turbine pivotally mounted within said casing in a collinear downstream relationship to said impeller and having a plurality of fluid-conducting openings therethrough which are linear and parallel with said axis and which are disposed to receive and pass fluid accelerated by the impeller, a gyroscope including a rotor structure having a rotor mounted for rotation about a spin axis and a second synchronous electric motor rotating said rotor at speeds proportionally related to the frequency of electrical excitation thereof, a main gimbal supporting said rotor structure for pivotal movement about a minor axis normal to said spin axis, an outer frame fixed to said casing and supporting said main gimbal for angular movement about a major axis normal to said minor axis, means operative upon departure of said spin axis and major axis from a mutually perpendicular relationship to urge said rotor structure into said perpendicular relationship, a force rod movable along said major axis and coupled with said rotor structure to apply a torque thereto about said minor axis without obstructing movements of said main gimbal in relation to said outer frame, fluid-tight sealing means intermediate said gyroscope and the fluid-conducting interior of said casing, means coupling said force rod with said turbine at a predetermined radial distance from said longitudinal axis, alternating current means exciting said first and second motors with electrical signals of proportionally related frequencies whereby said motors run at proportionally related speeds and said gyroscope main gimbal tends to precess about said major axis responsive to said torque about said minor axis at a speed inversely proportional to the speed of rotation of said rotor and directly proportional to the speed of rotation of said impeller, and counter means actuated by rotation of said main gimbal in relation to said outer frame.

13. A fluid mass flowmeter comprising a mass flow detector adapted to be disposed in the flow path of a fluid, the detector including a movable member for accelerating fluid flowing through the detector and having means for providing an output signal proportionally related to the mass of the fluid accelerated by said member and the rate of movement of said member, a gyroscope having a rotor mounted for movement about a spin axis and about two mutually perpendicular support axes, means connected to the detector and gyroscope for applying about one support axis of the gyroscope a torque proportionally related to said output signal, motive means connected to said member and rotor to drive the same at proportionally related speed, and indicator means connected to the gyroscope and responsive to precession thereof about the support axis of the gyroscope other than said one axis.

14. A fluid mass flowmeter comprising a mass flow detector adapted to be disposed in the flow path of a fluid and having a rotatable member for accelerating fluid within the detector angularly about the axis of rotation of said member and motive means for rotating said member, means responsive to the action on said member by the fluid accelerated by said member for providing an output signal proportionally related to the mass of the fluid accelerated by said member and the rotational speed of said member, a gyroscope having a rotor mounted for movement about a spin axis and about two mutually perpendicular support axes, means connected to the detector and gyroscope for applying about one support axis of the gyroscope a torque proportionally related to said output signal, motive means connected to said rotor to drive the same at speeds proportionally related to the speed of said rotatable member, and indicator means connected to the gyroscope and responsive to gyroscope precession about the support axis thereof other than said one axis.

15. A fluid mass flowmeter comprising a mass flow detector adapted to be disposed in the flow path of a fluid having a rotatable member for accelerating fluid within the detector angularly about the axis of rotation of said member, a first synchronous motor drivingly connected to said member, the detector further including means for providing an output signal proportionally related to the mass of the fluid accelerated by said member and the rotational speed of said member, a gyroscope having a rotor mounted for movement about a spin axis and about two mutually perpendicular support axes, means connected to the detector and gyroscope for applying about one support axis of the gyroscope a torque proportionally related to said output signal, a second synchronous motor drivingly connected to said rotor, means for connecting the first and second motors to alternative current source means for providing currents to the motors having proportionally related frequencies, and indicator means connected to the gyroscope and responsive to gyroscope precession about the support axis thereof other than said one axis.

16. A fluid mass flowmeter comprising a mass flow detector adapted to be disposed in the flow path of a fluid and having a rotatable member for accelerating fluid flowing through the detector angularly about the axis of rotation of said member, motive means drivingly connected to said member, means for providing an output signal proportionally related to the mass of the fluid accelerated by said member and the rate of movement of said member including a reactor member disposed in the path of the fluid accelerated by said member, a gyroscope having a rotor mounted for movement about a spin axis and about two mutually perpendicular support axes, means connected to the detector and gyroscope for applying about one support axis of the gyroscope a torque proportionally related to said output signal, motive means connected to said rotor adapted to drive the same at a speed proportionally related to the rate of movement of said member, and indicator means connected to the gyroscope and responsive to gyroscope precession about the support axis thereof other than said one axis.

17. A fluid mass flowmeter comprising a mass flow detector adapted to be disposed in the flow path of a fluid and including rotatable impeller for accelerating fluid flowing through the detector angularly about the axis of the impeller, a first synchronous motor drivingly connected to the impeller, a turbine disposed coaxially of the impeller and in the flow path of the fluid accelerated by the impeller to have a torque exerted thereon proportionally related to the angular momentum of the fluid accelerated by the impeller, a gyroscope having a rotor mounted for movement about a spin axis and about two mutually perpendicular support axes, means connected to the turbine and gyroscope for applying about one support axis of the gryroscope a torque proportionally related to the torque on the turbine imparted by the fluid accelerated by the impeller, a second synchronous motor drivingly connected to the rotor, means for energizing said first and second synchronous motors to run at proportionally related speeds and indicator means connected to the gyroscope and responsive to gyroscope precession about the support axis thereof other than said one axis.

References Cited in the file of this patent

UNITED STATES PATENTS

| | | |
|---|---|---|
| 2,106,194 | Stover | Jan. 25, 1938 |
| 2,624,198 | Pearson | Jan. 6, 1953 |
| 2,714,310 | Jennings | Aug. 2, 1955 |